(12) United States Patent
Ueda

(10) Patent No.: US 12,510,596 B2
(45) Date of Patent: Dec. 30, 2025

(54) ENERGY STORAGE APPARATUS AND FAILURE DIAGNOSIS METHOD

(71) Applicant: GS Yuasa International Ltd., Kyoto (JP)

(72) Inventor: Yuki Ueda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 225 days.

(21) Appl. No.: 18/565,398

(22) PCT Filed: Apr. 14, 2022

(86) PCT No.: PCT/JP2022/017802
§ 371 (c)(1),
(2) Date: Nov. 29, 2023

(87) PCT Pub. No.: WO2022/254978
PCT Pub. Date: Dec. 8, 2022

(65) Prior Publication Data
US 2025/0102577 A1    Mar. 27, 2025

(30) Foreign Application Priority Data
May 31, 2021    (JP) ................. 2021-091061

(51) Int. Cl.
G01R 31/327    (2006.01)
H01M 10/42    (2006.01)
(Continued)

(52) U.S. Cl.
CPC .... *G01R 31/3278* (2013.01); *H01M 10/4285* (2013.01); *H01M 50/583* (2021.01); *H02H 7/18* (2013.01); *H01M 2220/20* (2013.01)

(58) Field of Classification Search
CPC .................................................. G01R 31/3278
See application file for complete search history.

(56) References Cited

U.S. PATENT DOCUMENTS 4,914,315 A * 4/1990 Nickolai .............. H01H 47/002
361/170
2005/0248318 A1* 11/2005 Denning ............. H02J 7/00308
320/134
(Continued)

FOREIGN PATENT DOCUMENTS

CN    102944844 B    4/2015
JP    2007-329045 A    12/2007
(Continued)

OTHER PUBLICATIONS

International Search Report and Written Opinion for International Application No. PCT/JP2022/017802, dated Jun. 14, 2022, (8 pages), Japan Patent Office, Tokyo, Japan.

Primary Examiner — Walter L Lindsay, Jr.
Assistant Examiner — Milton Gonzalez
(74) Attorney, Agent, or Firm — Buchalter, a Professional Corporation

(57) ABSTRACT

An energy storage apparatus includes: an external terminal 51; an energy storage cell 62; a current interruption device 53 that has one end electrically connected to the external terminal 51 and the other end electrically connected to the energy storage cell 62; a discharge circuit 110 that discharges electricity from the energy storage cell 62 via a path that does not pass through the current interruption device 53; and a failure diagnosis device 150. The failure diagnosis device 150 discharges electricity from the energy storage cell 62 using the discharge circuit 110, and diagnoses a failure of the current interruption device 53 based on a change in voltage $\Delta V1$ of the external terminal 51 before and after discharging electricity.

6 Claims, 9 Drawing Sheets

(51) Int. Cl.
    *H01M 50/583*    (2021.01)
    *H02H 7/18*    (2006.01)

(56) References Cited

U.S. PATENT DOCUMENTS

| | | |
|---|---|---|
| 2015/0035539 A1 | 2/2015 | Wakida et al. |
| 2016/0336626 A1 | 11/2016 | Kawauchi et al. |
| 2018/0024196 A1 | 1/2018 | Imura et al. |
| 2018/0238968 A1 | 8/2018 | Wada et al. |
| 2019/0271743 A1 | 9/2019 | Imura et al. |
| 2020/0174076 A1 | 6/2020 | Imanaka |
| 2021/0231707 A1 | 7/2021 | Ock et al. |

FOREIGN PATENT DOCUMENTS

| | | |
|---|---|---|
| JP | 2014-051956 A | 3/2014 |
| JP | 2015-008600 A | 1/2015 |
| JP | 2015-033233 A | 2/2015 |
| JP | 2016-010263 A | 1/2016 |
| JP | 2017-005985 A | 1/2017 |
| JP | 2018-136314 A | 8/2018 |
| JP | 2019-165589 A | 9/2019 |
| WO | WO-2016/103721 A1 | 6/2016 |
| WO | WO-2018/235774 A1 | 12/2018 |
| WO | WO-2020/145768 A1 | 7/2020 |

\* cited by examiner

Fig. 8

Change in voltage before and after discharging

|  | Closed | Open |
|---|---|---|
| V1 | X⇒Y | X |

Change in voltage before and after discharging

|  | Closed | Open |
|---|---|---|
| ΔV1 | X−Y | 0 |
| ΔV2 | X−Y | X−Y |
| Comparison of change in voltage | ΔV1 = ΔV2 | ΔV1 ≠ ΔV2 |

(X>Y)

ENERGY STORAGE APPARATUS AND FAILURE DIAGNOSIS METHOD

CROSS REFERENCE TO RELATED APPLICATIONS

This application is a National Stage Application, filed under 35 U.S.C. § 371, of International Application No. PCT/JP2022/017802, filed Apr. 14, 2022, which international application claims priority to and the benefit of Japanese Application No. 2021-091061, filed May 31, 2021; the contents of both of which are hereby incorporated by reference in their entirety.

BACKGROUND

Technical Field

The present invention relates to a technique for diagnosing a failure of a current interruption device.

Description of Related Art

A battery mounted on a vehicle such as an automobile has a current interruption device. In a case where any abnormality is detected, the current interruption device interrupts a current thus protecting the battery (see Patent Document JP-A-2017-5985).

BRIEF SUMMARY

In a battery for vehicle, in a case where a current interruption device has a failure so that the current interruption device is kept fixed to an open state, there is a possibility that the supply of electricity from the battery to the vehicle is interrupted so that a power fail (a power supply loss) of the vehicle occurs. In a case where a current interruption device has a failure so that the current interruption device is kept fixed to a closed state, even when an abnormality is detected, there is a possibility that a battery cannot be protected. In view of the above, there has been a demand for enhancing accuracy of a failure diagnosis of the current interruption device. Further, also in applications other than a vehicle, it is desirable to enhance accuracy of a failure diagnosis of the current interruption device.

One aspect of the present invention is to disclose a technique for enhancing accuracy of a failure diagnosis of a current interruption device.

An energy storage apparatus includes: an external terminal; an energy storage cell; a current interruption device that has one end electrically connected to the external terminal and another end electrically connected to the energy storage cell; a discharge circuit that discharges electricity from the energy storage cell via a path that does not pass through the current interruption device; and a failure diagnosis device. The failure diagnosis device discharges electricity from the energy storage cell using the discharge circuit, and diagnoses a failure of the current interruption device based on a change in voltage of the external terminal before and after discharging electricity.

This technique is also applicable to a failure diagnosis method of a current interruption device and a failure diagnosis program.

The present technique can enhance the accuracy of a failure diagnosis of a current interruption device.

BRIEF DESCRIPTION OF THE FIGURES

FIG. 8 is a table in which voltages at a point A before and after discharging electricity are collected.
FIG. 9 is a table in which a change in voltage at the point A before and after discharging electricity and are change in voltage at a point B before and after discharging electricity are collected.

DETAILED DESCRIPTION OF VARIOUS EMBODIMENTS

Figure 1:
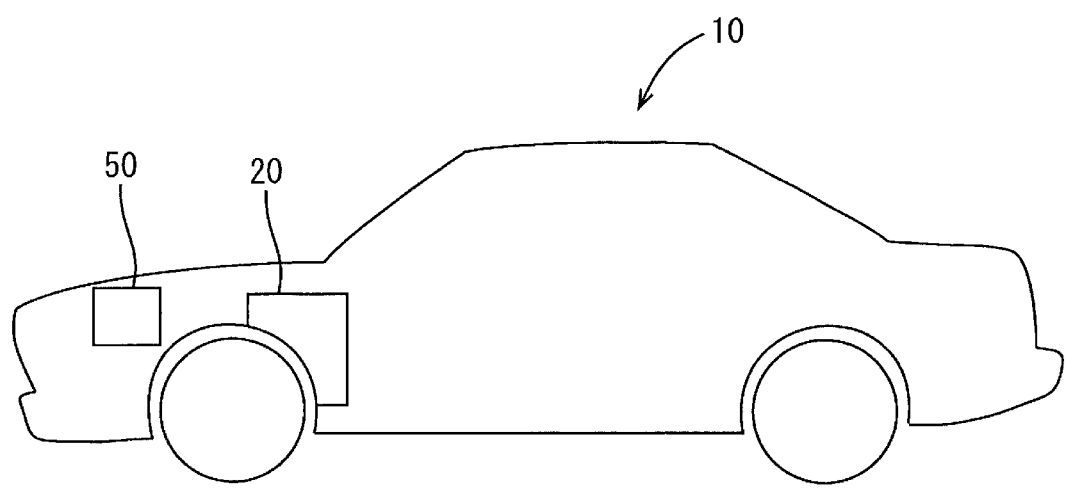
FIG. 1 is a side view of a vehicle.

The overall configuration of an energy storage apparatus will be described.

An energy storage apparatus includes: an external terminal; an energy storage cell; a current interruption device that has one end electrically connected to the external terminal and another end electrically connected to the energy storage cell; a discharge circuit that discharges electricity from the energy storage cell via a path that does not pass through the current interruption device; and a failure diagnosis device. The failure diagnosis device discharges electricity from the energy storage cell using the discharge circuit, and diagnoses a failure of the current interruption device based on a change in voltage of the external terminal before and after discharging electricity.

With this configuration, for example, in a case where the energy storage apparatus is provided for a vehicle, it is possible to accurately determine an "open" state and a "closed" state of the current interruption device without relying on the state of the vehicle system. Accordingly, the accuracy of a failure diagnosis of the current interruption device can be enhanced. Even in a case where the energy storage apparatus is used for other moving bodies or for applications other than the moving body, it is possible to accurately determine whether the current interruption device is in an "open" state or in a "closed" state without relying on a state of a host system. Accordingly, it is possible to improve the accuracy of a failure diagnosis of a current interruption device.

In a case where an absolute value of a voltage difference between a voltage of an external terminal and a voltage of the energy storage cell is less than a voltage threshold, the failure diagnosis device may discharge electricity from the energy storage cell using the discharge circuit, and may diagnose a failure of the current interruption device based on a change in voltage of the external terminal before and after discharging electricity.

When the current interruption device is in a "closed" state, a voltage of an external terminal is substantially the same as a voltage of the energy storage cell. However, even when the current interruption device is in an "open" state, there may be a case where the voltage of the external terminal becomes substantially the same as the voltage of the energy storage cell depending on a state of a vehicle system or a host system. Accordingly, when an absolute value of the voltage difference between the external terminal and the energy storage cell is less than a voltage threshold, it is difficult to determine whether the current interruption device is in an "open" state or in a "closed" state. With the use of the present technique, when an absolute value of the voltage difference between the external terminal and the energy storage cell is less than a voltage threshold, it is possible to accurately determine whether the current interruption device is in an "open" state or in a "closed" state.

The failure diagnosis device may diagnose a failure of the current interruption device based on a result of comparison between a change in voltage of the external terminal and a change in voltage of the energy storage cell before and after discharging electricity.

In the case of determining an "open" state and a "closed" state of the current interruption device only by a change in voltage of the external terminal before and after discharging electricity, when the voltage of the external terminal is changed by a cause other than discharging of the energy storage cell, there is a possibility that the state of the current interruption device is erroneously determined. With the configuration of the present invention, by comparing a change in voltage of the external terminal and a change in voltage of the energy storage cell, even when the voltage of the external terminal is changed due to a cause other than the discharging, it is possible to accurately determine whether the current interruption device is in an "open" state or in a "closed" state.

The energy storage cell may include a plurality of energy storage cells connected in series (assembled battery). The discharge circuit may include a cell discharge circuit that allows the respective energy storage cell to discharge electricity individually. In this configuration, a discharge circuit for cell balancing is used for a failure diagnosis of the current interruption device. Normally, the management device of the energy storage apparatus includes a discharge circuit for cell balancing and hence, this discharge circuit of the management device is used for a failure diagnosis. With such a configuration, it is not necessary to provide a discharge circuit dedicated to a failure diagnosis, and an increase in the number of components can be suppressed.

The energy storage apparatus may be for a moving body. That is, the energy storage apparatus may be mountable on the moving body. The energy storage apparatus mounted on the moving body is exposed to vibration accompanying the movement of the moving body. Accordingly, such an energy storage apparatus is likely to cause a malfunction (an unintended operation of a relay) as compared with a stationary energy storage apparatus. By improving the accuracy of a failure diagnosis of the current interruption device, a failure or a malfunction of the current interruption device can be detected early. In a case where a failure or a malfunction of the current interruption device is detected, by taking a necessary measure such as operating a redundancy circuit, it is possible to suppress a power fail of the moving body.

First Embodiment

1. Description of Battery 50

As illustrated in FIG. 1, an engine 20 and a battery 50 used for starting the engine 20 and the like are mounted on the vehicle 10. The battery 50 is an example of "energy storage apparatus". On the vehicle 10, in place of the engine 20 (internal combustion engine), an energy storage apparatus for driving the vehicle or a fuel battery may be mounted.

Figure 2:
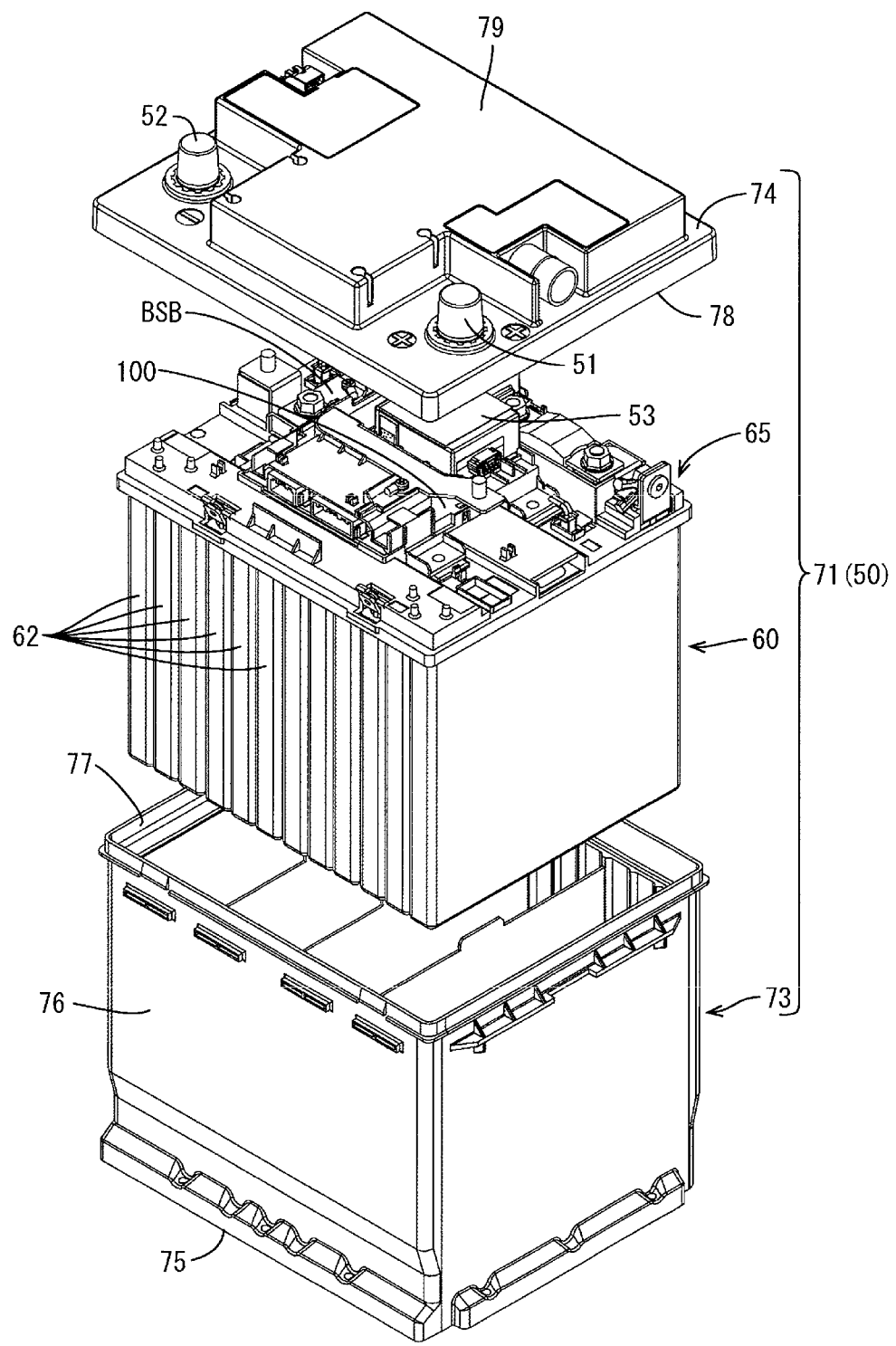
FIG. 2 is an exploded perspective view of a battery.

As illustrated in FIG. 2, the battery 50 includes an assembled battery 60, a circuit board unit 65, and a container 71. The container 71 includes a body 73 made of a synthetic resin material, and a lid body 74. The main body 73 has a bottomed cylindrical shape, and includes a bottom surface portion 75 and four side surface portions 76. An opening 77 is formed at an upper end of the main body 73 by four side surface portions 76.

The container 71 contains the assembled battery 60 and a circuit board unit 65 therein. The circuit board unit 65 is a board unit where various components (the current interruption device 53, a current detection unit 54, a management device 150 and the like illustrated in FIG. 5) are mounted on the circuit board 100. As illustrated in FIG. 2, the circuit board unit 65 is disposed, for example, above and adjacently to the assembled battery 60 as illustrated in FIG. 2. Alternatively, the circuit board unit 65 may be disposed adjacently to a side of the assembled battery 60.

The lid body 74 closes the opening 77 of the main body 73. An outer peripheral wall 78 is formed on a periphery of the lid body 74. The lid body 74 has a protruding portion 79 having an approximately T shape as viewed in a plan view. On a front portion of the lid body 74, a positive external terminal 51 is fixed to one corner portion, and a negative external terminal 52 is fixed to the other corner portion. The circuit board unit 65 may be contained in the lid body 74 (for example, in the protruding portion 79) in place of being contained in the body 73 of the container 71.

Figure 4:
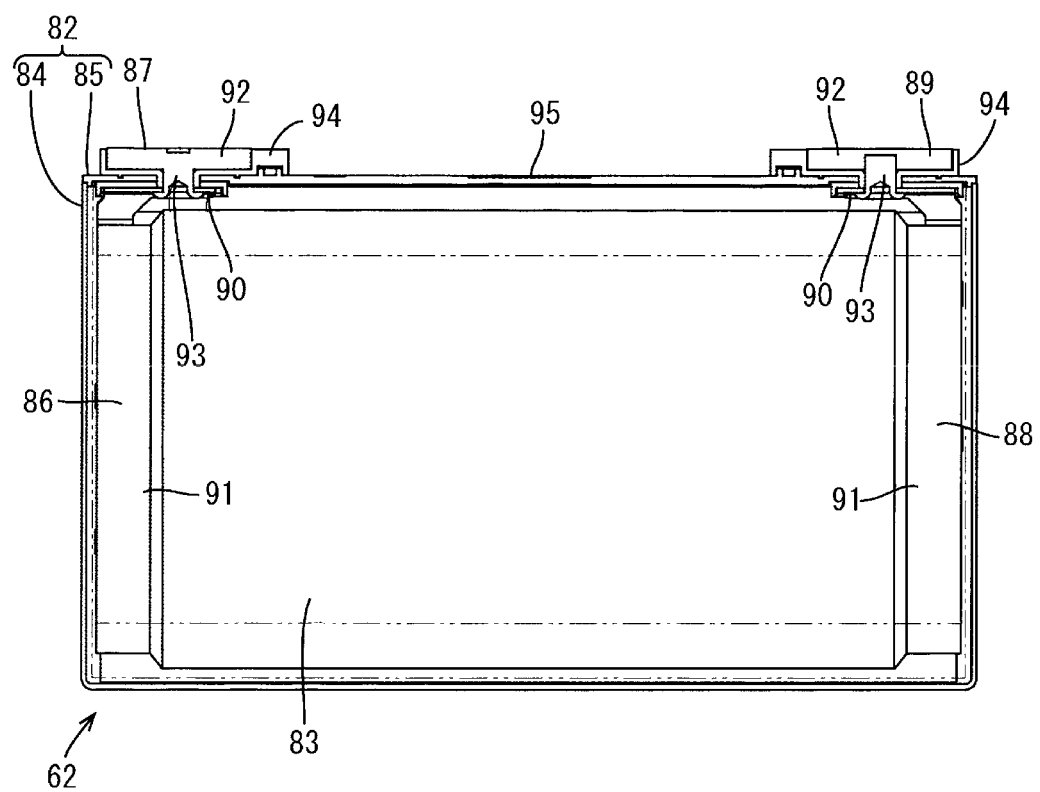
FIG. 4 is a cross-sectional view taken along a line A-A in FIG. 3.

The assembled battery 60 includes a plurality of cells 62. As illustrated in FIG. 4, the cell 62 is configured such that an electrode assembly 83 is accommodated in a case 82 having a rectangular parallelepiped shape (a prismatic shape) together with a nonaqueous electrolyte. The cell 62 is, for example, a lithium ion secondary battery cell. The case 82 includes a case body 84 and a lid 85 that closes an opening portion formed at an upper portion of the case body 84.

Although not illustrated in detail in the drawing, the electrode assembly 83 is formed by disposing a separator formed of a porous resin film between a negative plate formed by applying an active material to a substrate formed of a copper foil and a positive plate formed by applying an active material to a substrate formed of an aluminum foil. These elements each have a strip shape, and are wound in a flat shape so as to be accommodated in the case body 84 in a state where the position of the negative plate and the position of the positive plate are displaced on opposite sides in the width direction with respect to the separator. The electrode assembly 83 may be of a stacked type in place of a wound type.

A positive terminal 87 is connected to the positive plate via a positive electrode current collector 86, and a negative terminal 89 is connected to the negative plate via a negative electrode current collector 88. The positive electrode current collector 86 and the negative electrode current collector 88 are each formed of a flat plate-like pedestal portion 90 and a leg portion 91 extending from the pedestal portion 90. A through hole is formed in the pedestal portion 90. The leg portion 91 is connected to the positive plate or the negative plate.

Figure 3:
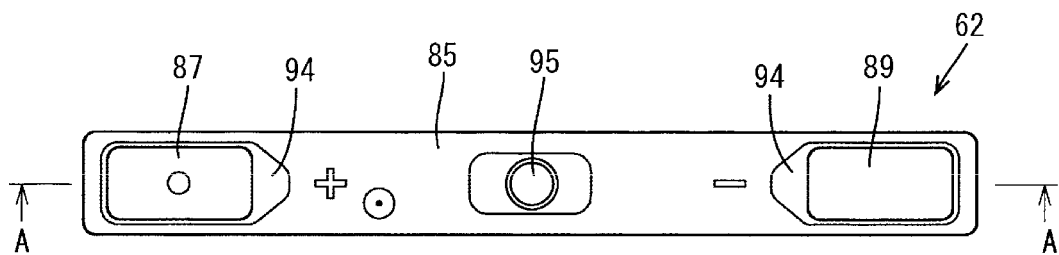
FIG. 3 is a plan view of a secondary battery cell.

The positive terminal 87 and the negative terminal 89 each include: a terminal body portion 92; and a shaft portion 93 protruding downward from a center portion of a lower surface of the terminal body portion 92. The terminal body portion 92 and the shaft portion 93 of the positive terminal 87 are integrally formed with each other using aluminum (a single material). In the negative terminal 89, the terminal body portion 92 is made of aluminum, and the shaft portion 93 is made of copper. The negative terminal 89 is formed by assembling the terminal body portion 92 and the shaft portion 93 to each other. The terminal body portion 92 of the positive terminal 87 and the terminal body portion 92 of the negative terminal 89 are disposed at both end portions of the lid 85 by way of gaskets 94 made of an insulating material. As illustrated in FIG. 3, the terminal body portion 92 of the positive terminal 87 and the terminal body portion 92 of the negative terminal 89 are exposed outward from the gaskets 94.

The lid 85 has a pressure release valve 95. The pressure release valve 95 is positioned between the positive terminal 87 and the negative terminal 89. The pressure release valve 95 is a safety valve. The pressure release valve 95 is released when an internal pressure in the case 82 exceeds a limit value so as to lower the internal pressure in the case 82.

Figure 5:
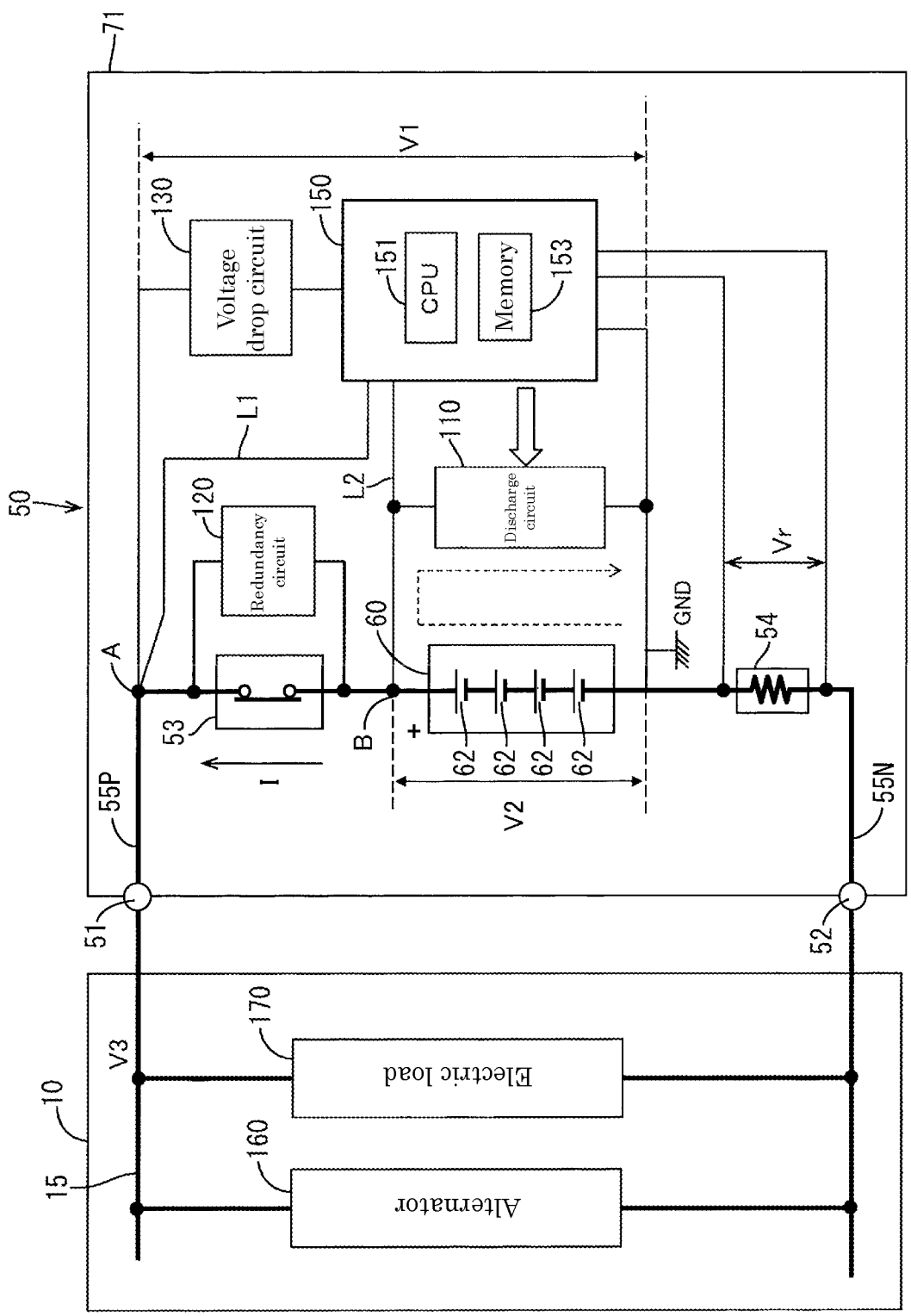
FIG. 5 is a block diagram of the battery.

FIG. 5 is a block diagram illustrating an electrical configuration of the battery 50. The battery 50 includes the assembled battery 60, the current interruption device 53, the current detection unit 54, a discharge circuit 110, a redundancy circuit 120, a voltage drop circuit 130, and the management device 150.

In the battery 50, an alternator 160 that is a generator for generating electricity using power of the engine 20, and an electric load 170 mounted on the vehicle 10 are electrically connected to each other.

In a case where an electricity generation amount of the alternator 160 is larger than the power consumption amount of the electric load 170 during driving of the engine 20, the battery 50 is charged with the electricity by the alternator 160. In a case where the electricity generation amount of the alternator 160 is smaller than the power consumption amount of the electric load 170, the battery 50 discharges electricity to compensate for a shortage of electricity.

In a state where the engine 20 is stopped, the alternator 160 stops the generation of electricity. During the generation of power is stopped, the battery 50 is brought into a state where the battery is not charged with electricity, that is, the battery 50 is brought into a state where the battery performs only discharging of electricity to the electric load 170.

For example, twelve cells 62 of the assembled battery 60 (see FIG. 2) are connected with each other in three parallels and four series. In FIG. 5, three cells 62 that are connected in parallel are indicated by one battery symbol. The cell 62 is an example of an "energy storage cell". The energy storage cell is not limited to a prismatic cell, and may be a cylindrical cell or a pouch cell having a laminate film case.

The assembled battery 60, the current interruption device 53 and the current detection unit 54 are connected in series via a power line 55P and a power line 55N. As the power lines 55P, 55N, a bus bar BSB (see FIG. 2) that is a plate-like conductor made of a metal material such as copper can be used.

As illustrated in FIG. 5, the power line 55P connects the positive external terminal 51 and the positive electrode of the assembled battery 60. The power line 55N connects the negative external terminal 52 and the negative electrode of the assembled battery 60. The external terminals 51, 52 are terminals for connecting the battery 50 with the vehicle 10. That is, the battery 50 can be electrically connected to the alternator 160 and the electric load 170 via the external terminals 51, 52.

The current interruption device 53 is provided to the positive power line 55P. One end of the current interruption device 53 is electrically connected to the positive external terminal 51, and the other end of the current interruption device 53 is electrically connected to the positive electrode of the assembled battery 60. The current interruption device 53 may be a semiconductor switch such as an FET or a relay having a mechanical contact. The current interruption device 53 is preferably a self-holding switch such as a latch relay.

The current interruption device 53 is of a normally closed type, and is controlled to be in a closed state (a conductive state) in a normal state. When any abnormality occurs in the battery 50, a current I of the assembled battery 60 can be interrupted by changing over the current interruption device 53 from "a closed state" to "an open state".

In the present specification, one end and the other end of the current interruption device 53 mean electrical connection points of the current interruption device 53. In a case where the current interruption device 53 is a relay, one end of the current interruption device 53 may be a first terminal of the relay, and the other end of the current interruption device 53 may be a second terminal of the relay. The first terminal and the second terminal of the relay may be provided to different surfaces (or different sides in a plan view) of a housing of the relay, or may be provided to the same surface (or the same side in a plan view) of the housing of the relay.

The current detection unit 54 is provided to the negative power line 55N. The current detection unit 54 may be a shunt resistor. The current detection unit 54 of a resistance type can measure a current I of the assembled battery 60 based on the voltage Vr between both ends of the current detection unit 54. The current detection unit 54 of a resistance type can determine discharging and charging of electricity based on the polarity (positive or negative) of a voltage. Alternatively, the current detection unit 54 may be a magnetic sensor.

Figure 6:
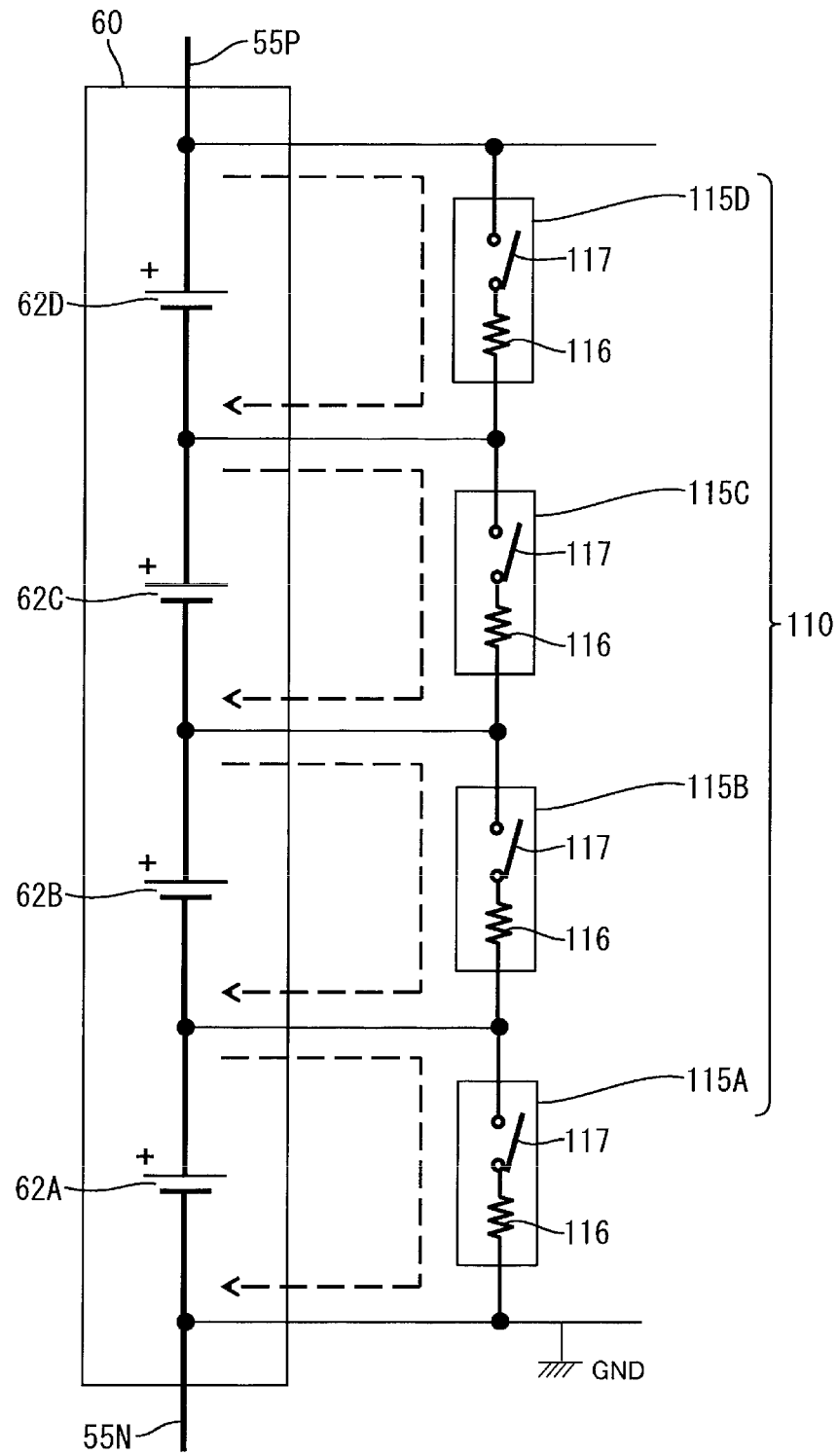
FIG. 6 is a circuit diagram of a discharge circuit.

The discharge circuit 110 is connected in parallel with the assembled battery 60, and allows the assembled battery 60 to discharge electricity without via the current interruption device 53. In this embodiment, as illustrated in FIG. 6, the discharge circuit 110 uses cell discharge circuits 115A to 115D for cell balancing (for equalizing capacities). The respective cell discharge circuits 115A to 115D are connected in parallel to the respective cells 62A to 62D. Each of the cell discharge circuits 115A to 115D includes a discharge resistor 116 and a switch 117. By turning on the switch 117, electricity can be discharged from the cell 62 corresponding to the switch 117.

Figure 7:
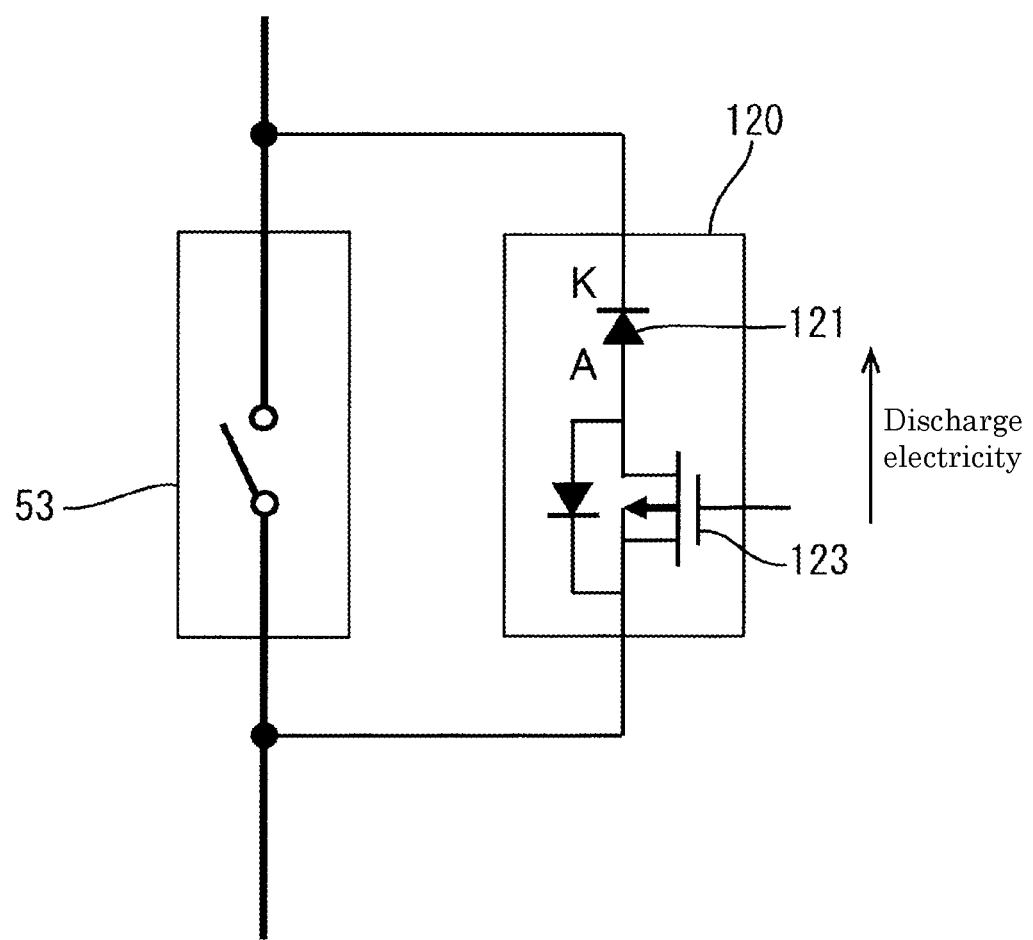
FIG. 7 is a circuit diagram of a redundancy circuit.

The redundancy circuit 120 is connected in parallel to the current interruption device 53. For example, as illustrated in FIG. 7, the redundancy circuit 120 includes a diode 121 and a semiconductor switch 123. The diode 121 connects its cathode K to the external terminal 51. One end of the semiconductor switch 123 is connected to an anode A of the diode 121 and the other end of the semiconductor switch 123 is connected to the positive electrode of the assembled battery 60. The forward direction of the diode 121 is a discharging direction of the assembled battery 60. By turning on the semiconductor switch 123, the assembled battery 60 can supply power to the vehicle 10 via the redundancy circuit 120 even when a failure occurs in the current interruption device 53.

The management device 150 is mounted on the circuit board 100 (see FIG. 2). As illustrated in FIG. 5, the management device 150 includes a CPU 151 and a memory 153. The management device 150 is connected to the point A and the point B in FIG. 5 via a measurement line L1 and a measurement line L2, and can detect a terminal voltage V1 of the battery 50 and a total voltage V2 of the assembled battery 60. The management device 150 is an example of a "failure diagnosis device".

Figure 10:
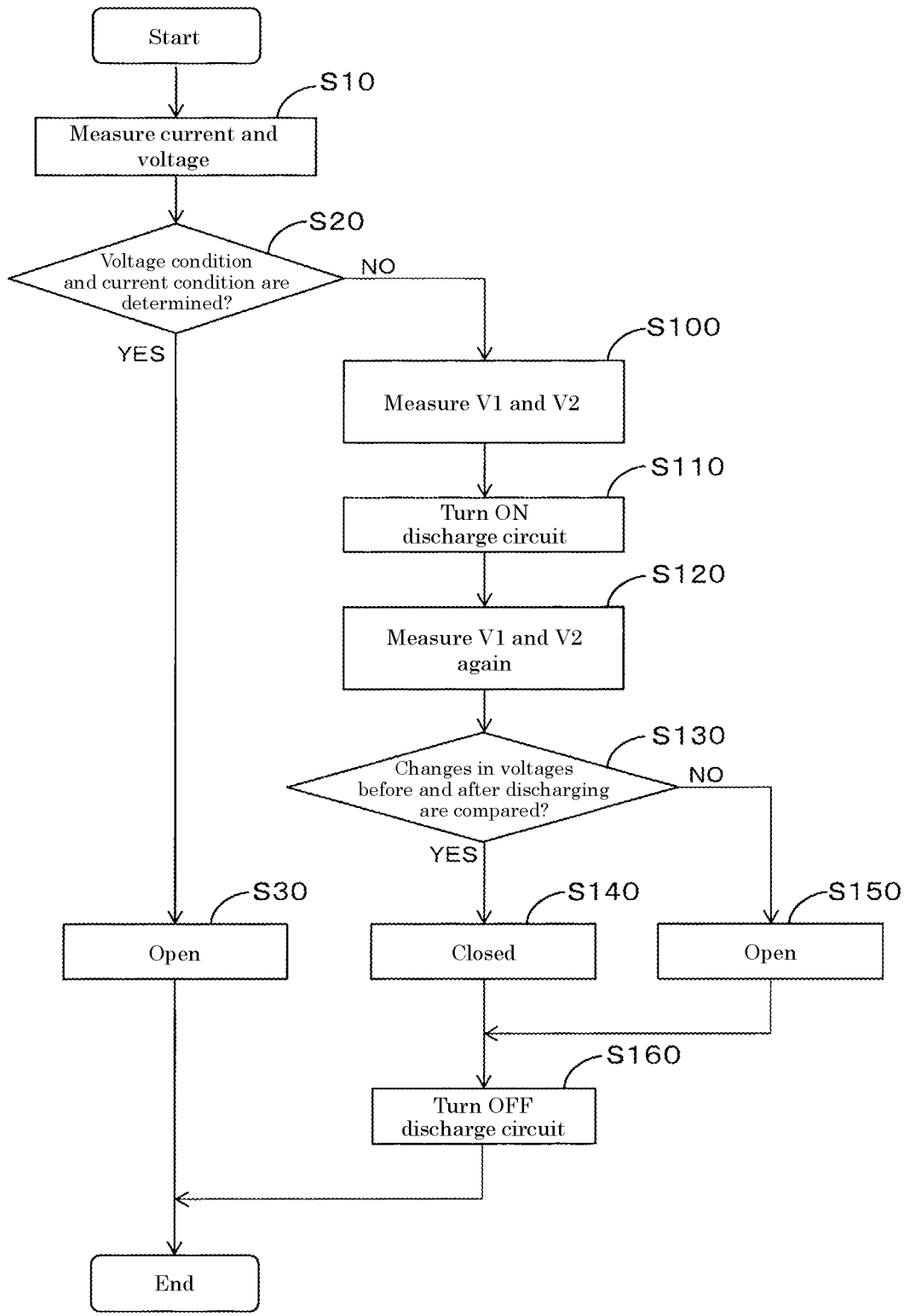
FIG. 10 is a failure diagnosis flow of a current interruption device.

The memory 153 stores a program for performing a failure diagnosis flow illustrated in FIG. 10 and data necessary for executing the program. The program may be stored in a recording medium such as a CD-ROM, and may be used, transferred, lent, or the like. The program may also be distributed using an electric communication line.

The voltage drop circuit 130 is connected to the point A in FIG. 5. The voltage drop circuit 130 drops a terminal voltage V1 of battery 50 from "12 V" to a predetermined voltage such as "5 V", and supplies the dropped voltage to the management device 150.

2. Diagnosis of Failure in Current Interruption Device

When an "open failure (failure being kept fixed to an open state)" occurs in the current interruption device 53, there is a possibility that the supply of electricity to the vehicle 10 is interrupted. Accordingly, to secure the supply of power to the vehicle 10, it is required to perform a diagnosis of a failure in the current interruption device 53.

In a case where the current interruption device 53 is in a "closed (normal) state", a voltage V1 at the point A and a voltage V2 at the point B are substantially the same voltage, and if the assembled battery 60 is being charged with electricity or is discharging electricity, a current I of a predetermined value or more flows.

Accordingly, it is conceivable to perform a diagnosis of a failure in the current interruption device 53 based on a current I of the battery 50 and voltages V1 and V2 at the points A and B.

$$|V1-V2| \geq K_{(V)} \quad \text{Formula (1)}$$

$$|I| \leq K_{(I)} \quad \text{Formula (2)}$$

$K_{(V)}$ is a voltage threshold that is decided based on a voltage measurement error or the like, and is 2 [V] in this embodiment. $K_{(I)}$ is a current threshold that is decided based on a current measurement error or the like, and is 1 [A] in this embodiment.

In a case where both the voltage condition expressed by the formula (1) and the current condition expressed by the formula (2) are satisfied when the current interruption device 53 receives a command of "close", the management device 150 determines that the current interruption device 53 has an "open failure".

In a case where either one condition out of the voltage condition expressed by the formula (1) and the current condition expressed by the formula (2) is not satisfied when the current interruption device 53 receives a command of "close", the management device 150 determines that the current interruption device 53 is in a "close (normal))" state".

In a case where a failure diagnosis of the current interruption device 53 is performed based on two conditions consisting of the voltage condition expressed by the formula (1) and the current condition expressed by formula (2), there is a possibility that a state of the current interruption device 53 cannot be accurately detected due to a state of a vehicle system such as the alternator 160, the electric load 170 or the like so that a failure diagnosis is erroneously performed.

Specifically, when the current interruption device 53 is in an "open failure" state, the terminal voltage V1 of the battery 50 is equal to a voltage V3 of a power supply line 15 of the vehicle 10. When a voltage difference between the voltage V3 and the voltage V2 is small, the relationship of V1≈V2 is established and hence, there is a possibility that the voltage condition expressed by the formula (1) is not satisfied. Accordingly, even if the current interruption device 53 is actually in an "open failure" state, there is a possibility that it is erroneously determined that the current interruption device 53 is in a "closed (normal)" state.

In a case where either one condition out of the voltage condition expressed by the formula (1) and the current condition expressed by the formula (2) is not satisfied, the management device 150 does not determine that the current interruption device 53 is in a "closed (normal))" state" and discharges electricity from the assembled battery 60 by the discharge circuit 110. A voltage at the point B (a voltage of the positive electrode of the assembled battery 60) V2 is changed from X [V] to Y [V] by discharging.

In a case where the current interruption device 53 is in a "closed" state, as illustrated in FIG. 8, the voltage V1 at the point A (a voltage of the positive external terminal 51) is changed from X [V] to Y [V] by discharging in the same manner as the voltage V2. On the other hand, in a case where the current interruption device 53 is in an "open" state, the voltage V1 at the point A is not changed due to discharging and maintains X [V].

As described above, when electricity is discharged from the assembled battery 60, a change in the voltage V1 at the point A differs between the case where the current interruption device 53 is in a "closed" state and the case where the current interruption device 53 is in an "open" state. Accordingly, it is possible to accurately determine whether the current interruption device 53 is in an "open" state or in a "closed" state based on a change ΔV1 in the voltage V1 at the point A before and after discharging electricity.

In this embodiment, as illustrated in FIG. 9, the management device 150 calculates changes in voltages ΔV1, ΔV2 before and after discharging electricity with respect to the voltage V1 at the point A and the voltage V2 at the point B. The management device 150 determines that the current interruption device 53 is in a "closed (normal)" state when the relationship of ΔV1=ΔV2 is established, and determines that the current interruption device 53 is in an "open failure" state when the relationship of ΔV1≠ΔV2 is established.

$$\Delta V1 = (V1_{1ST}) - (V1_{2ND})$$

$$\Delta V2 = (V2_{1ST}) - (V2_{2ND})$$

$V_{1ST}$ is a voltage before discharging electricity, and $V_{2ND}$ is a voltage after discharging electricity.

Hereinafter, a failure diagnosis flow of the current interruption device 53 will be described with reference to FIG. 10. The failure diagnosis flow of the current interruption device 53 includes steps S10 to S160, and the failure diagnosis flow is performed at a predetermined cycle during the activation of the management device 150, for example. In a state before the failure diagnosis flow is not performed, both the discharge circuit 110 and the redundancy circuit 120 are controlled to an "off" state. Further, the management device 150 issues a command "close" to the current interruption device 53 during a period that the failure diagnosis flow is performed.

When the failure diagnosis flow starts, the management device 150 measures a current I of the assembled current 60, a voltage V1 at the point A, and a voltage V2 at the point B (S10). The current I can be measured by the current detection unit 54, the voltage V1 at the point A can be measured by the measurement line L1, and the voltage V2 at the point B can be measured by the measurement line L2 respectively.

Thereafter, the management device 150 determines the voltage condition expressed by the formula (1) based on the measurement values of the voltages V1, V2, and determines the current condition expressed by the formula (2) based on the measurement value of the current I of the assembled battery 60 (S20).

In a case where both the voltage condition expressed by the formula (1) and the current condition expressed by the formula (2) are satisfied (S20: YES), the management device 150 determines that the current interruption device 53 has an "open failure" (S30).

When the management device 150 determines that the current interruption device 53 has an "open failure", the management device 150 changes over the switch 123 of the redundancy circuit 120 from an "off" state to an "on" state. By changing over the switch 123 to an "on" state, discharging of electricity via the redundancy circuit 120 becomes possible and hence, the supply of electricity from the assembled battery 60 to the vehicle 10 can be continued. With the above steps, the failure diagnosis flow ends.

Next, when either one of the conditions is not satisfied as the result of determining the voltage condition expressed by the formula (1) and the current condition expressed by the formula (2) (S20: NO), the management device 150 measures the voltage V1 at the point A and the voltage V2 at the point B using the measurement lines L1, L2 (S100).

After the measurement of the voltages V1, V2, the management device 150 changes over the discharge circuit 110 from an "off" state to an "on" state so as to discharge the assembled battery 60. Specifically, the management device 150 changes over the switches 117 of the respective cell discharge circuits 115A to 115D from an "off" state to an "on" state, and discharges electricity from the respective cells 62A to 62D for a predetermined time.

Thereafter, the management device 150 measures again the voltages V1 and V2 after discharging using the measurement lines L1 and L2 (S120).

The management device 150 calculates changes in voltages ΔV1 and ΔV2 before and after discharging electricity based on the voltages V1 and V2 before discharging that are measured in step S100 and the voltages V1 and V2 after discharging that are measured in step S120, respectively. The management device 150 compares the change in voltage ΔV1 with the change in voltage ΔV2 (S130).

In a case where the changes in voltages ΔV1 and ΔV2 at two points A, B agree with each other (ΔV1=ΔV2), the management device 150 determines that the current interruption device 53 is in a "closed (normal)" state (S140). Thereafter, the management device 150 changes over the discharge circuit 110 from an "on" state to an "off" state (S160). With the above steps, the failure diagnosis flow ends.

In a case where the changes in voltages ΔV1, ΔV2 at two points A and B do not agree with each other (ΔV1≠ΔV2), the management device 150 determines that the current interruption device 53 has an "open failure" (S150).

When the management device 150 determines that the current interruption device 53 has an "open failure", the management device 150 changes over the switch 123 of the redundancy circuit 120 from an "off" state to an "on" state. By changing over the switch 123 to an "on" state, discharging of electricity via the redundancy circuit 120 becomes possible and hence, the supply of electricity from the assembled battery 60 to the vehicle 10 can be continued.

Thereafter, the management device 150 changes over the discharge circuit 110 from an "on" state to an "off" state (S160). With the above steps, the failure diagnosis flow ends.

3. Description of Advantageous Effects

With this configuration, it is possible to accurately determine an "open" state and a "closed" state of the current interruption device 53 without relying on the state of the vehicle system. Accordingly, the accuracy of a failure diagnosis of the current interruption device 53 can be enhanced. By improving the accuracy of the failure diagnosis, an open failure of the current interruption device 53 can be detected early. In a case where an open failure of the current interruption device 53 is detected, by taking a necessary measure such as operating the redundancy circuit 120, it is possible to suppress a power fail (a power loss) of the vehicle 10.

This configuration can detect not only an open failure of the current interruption device 53 but also a malfunction of the current interruption device 53 that is unintentionally opened due to noise or the like. In a case where an erroneous operation of the current interruption device 53 is detected, the management device 150 transmits a close command to change over the current interruption device 53 from an "open" state to a "closed" state, so that a power fail (a power loss) of the vehicle 10 can be suppressed.

In the case of determining an "open" state and a "closed" state of the current interruption device 53 only by the change in voltage ΔV1 at the point A before and after discharging electricity, if the voltage V1 at the point A changes due to a cause other than discharging of electricity (for example, a change in voltage of the power supply line 15 of the vehicle), the state of the current interruption device 53 may be erroneously determined. In this configuration, by comparing the change in voltage ΔV1 at the point A and the change in voltage ΔV2 at the point B before and after discharging electricity, even when the voltage V1 at the point A changes due to a cause other than discharging electricity, the management device 150 can accurately determine whether the current interruption device 53 is in an "open" state or in a "closed" state.

OTHER EMBODIMENTS

The present invention is not limited to the embodiments described with reference to the above description and drawings. For example, the following embodiments are also included in the technical scope of the present invention.

(1) The secondary battery cell 62 is not limited to the lithium ion secondary battery, and may be other non-aqueous electrolyte secondary battery. The secondary battery cells 62 are not limited to be connected in series and in parallel, and may be connected in series or may be formed of a single cell. A capacitor can be used instead of the secondary battery cell 62. The secondary battery cell and the capacitor are examples of the energy storage cell.

(2) In the above embodiment, the battery 50 is mounted on the vehicle 10. However, the battery 50 may be mounted on a moving body other than the vehicle, such as a ship or an aircraft. The present invention is not limited to the moving body, and may be used for other purposes such as an energy storage apparatus of a power generation system or an uninterruptible power supply (UPS).

Figure 11:
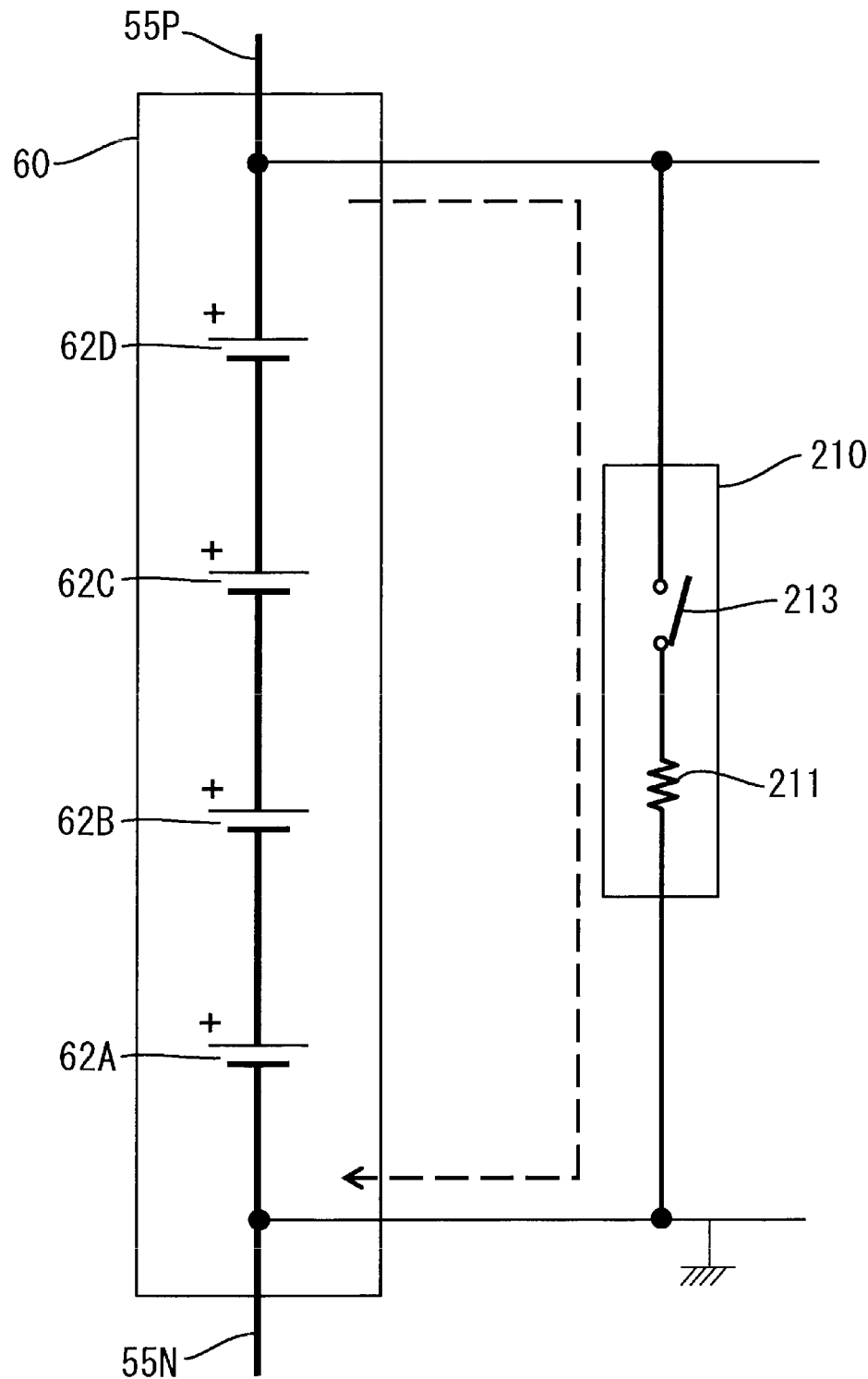
FIG. 11 is a circuit diagram of a discharge circuit.

(3) In the above embodiment, the discharge circuit 110 includes the cell discharge circuits 115A to 115D. The discharge circuit 110 may be any circuit as long as such a circuit allows the assembled battery 60 to discharge electricity without passing through the current interruption device 53. For example, as in the case of a discharge circuit 210 illustrated in FIG. 11, the discharge circuit 210 may include one discharge resistor 211 and one switch 213.

(4) In the above embodiment, the redundancy circuit 120 is disposed in parallel with the current interruption device 53. However, the redundancy circuit 120 may be omitted.

(5) In the above embodiment, the failure diagnosis flow of the current interruption device 53 includes steps S10 to S160. However, steps S10, S20 may be omitted. That is, the failure diagnosis flow of the current interruption device 53 may include only steps S100 to S160.

(6) In the above embodiment, the failure of the current interruption device 53 is determined based on the changes in voltages $\Delta V1$, $\Delta V2$ before and after discharging electricity at the point A and the point B. Specifically, in a case where the changes in voltages $\Delta V1$, $\Delta V2$ agree with each other ($\Delta V1 = \Delta V2$) at the point A and the point B, the management device 150 determines that the current interruption device 53 is in a "closed (normal)" state. On the other hand, in a case where the changes in voltages $\Delta V1$, $\Delta V2$ do not agree with each other ($\Delta V1 \neq \Delta V2$), the management device 150 determines that the current interruption device 53 has an "open failure". Any determination method may be used provided that the management device 150 determines a failure of the current interruption device 53 based on a change in voltage $\Delta V1$ at the point A before and after discharging electricity. For example, a determination method may be adopted wherein the current interruption device 53 is in a closed (normal) state in a case where the voltage V1 at the point A is changed by discharging electricity from the assembled battery 60, and the current interruption device 53 has an open failure in a case where the voltage V1 at the point A is not changed.

(7) In the above embodiment, the "open failure" of the current interruption device 53 is detected. In a case where the current interruption device 53 can be temporarily controlled to an open state such as a case where the vehicle has the two power supply configuration (a case where another battery is mounted on the vehicle 10 in addition to the battery 50), the failure diagnosis in steps S100 to S160 may be performed during an open control of the current interruption device 53 so as to detect a "closed failure of the current interruption device 53 (a failure where the current interruption device 53 being kept fixed to a close state)".

The invention claimed is:

1. An energy storage apparatus comprising:
an external terminal;
an energy storage cell;
a current interruption device that has one end electrically connected to the external terminal and another end electrically connected to the energy storage cell;
a discharge circuit that discharges electricity from the energy storage cell via a path that does not pass through the current interruption device; and
a failure diagnosis device,
wherein the failure diagnosis device discharges electricity from the energy storage cell using the discharge circuit, and diagnoses a failure of the current interruption device based on a change in voltage of the external terminal before and after discharging electricity.

2. The energy storage apparatus according to claim 1, wherein
the failure diagnosis device, in a case where an absolute value of a difference in voltage between a voltage of the external terminal and a voltage of the energy storage cell is less than a voltage threshold, discharges electricity from the energy storage cell using the discharge circuit, and diagnoses the failure of the current interruption device based on the change in voltage of the external terminal before and after discharging electricity.

3. The energy storage apparatus according to claim 1, wherein
the failure diagnosis device diagnoses the failure of the current interruption device based on a comparison result between the change in voltage of the external terminal and a change in voltage of the energy storage cell before and after discharging electricity.

4. The energy storage apparatus according to claim 1, wherein
the energy storage cell includes a plurality of energy storage cells connected in series, and
the discharge circuit includes a cell discharge circuit that allows each energy storage cell to individually discharge electricity.

5. An energy storage apparatus for a moving body according to claim 1.

6. A failure diagnosis method of a current interruption device, which has one end electrically connected to an external terminal and another end electrically connected to an energy storage cell, the method comprising:
a step of discharging electricity from the energy storage cell via a path that does not pass through the current interruption device; and
a step of diagnosing a failure of the current interruption device based on a change in voltage of the external terminal before and after discharging electricity.

* * * * *